United States Patent [19]

Harris et al.

[11] Patent Number: 5,393,810
[45] Date of Patent: Feb. 28, 1995

[54] METHOD AND COMPOSITION FOR BREAKING CROSSLINKED GELS

[75] Inventors: Phillip C. Harris; Stanley J. Heath, both of Duncan, Okla.

[73] Assignee: Halliburton Company, Duncan, Okla.

[21] Appl. No.: 176,165

[22] Filed: Dec. 30, 1993

[51] Int. Cl.$^6$ .......................... C08K 5/15; C08K 3/38; C08L 5/00; E21B 43/26
[52] U.S. Cl. ...................... 524/56; 523/130; 523/131; 524/404; 524/409; 524/423; 524/437; 166/280; 166/295
[58] Field of Search .................. 523/130, 131; 524/56, 524/419, 422, 404, 409, 423, 437; 166/280, 295

[56] References Cited

U.S. PATENT DOCUMENTS 3,929,191  12/1975  Graham et al. ...................... 166/276
4,829,100   5/1989  Murphey et al. ...................... 523/131

OTHER PUBLICATIONS

SPE 20640 "Application Of Curable Resin-Coated Proppants" L. R. Norman, J. M. Terracina, M. A. McCabe and P. D. Nguyen, Halliburton Services. Copyright 1990, and presented at the 65th Annual Technical Conference & Exhibition held in New Orleans, La. on Sep. 23–26, 1990.

*Primary Examiner*—Paul R. Michl
*Assistant Examiner*—LaVonda R. DeWitt
*Attorney, Agent, or Firm*—Robert A. Kent

[57] ABSTRACT

Compositions and methods are provided which provide improved viscosity reduction of crosslinked hydratable polymer treating fluids in the presence of uncured resin-coated proppants. The uncured resins are generally uncured phenolic or furan resins. The breaker comprises an oxidizing agent to which is added a sequestering agent comprising a copolymer of vinylpyrrolidone and acrylic acid to sequester at least a portion of any phenolic extracts from said resin that may be present in said treating fluid from contact with the uncured resin.

12 Claims, No Drawings

METHOD AND COMPOSITION FOR BREAKING CROSSLINKED GELS

BACKGROUND OF THE INVENTION

1. Field of the Invention

This invention relates to methods and compositions for treating subterranean formations. More particularly it relates to methods and compositions for treating a subterranean formation penetrated by a wellbore utilizing a crosslinked gel and thereafter reducing the viscosity of the crosslinked gels in the presence of phenolic resin-coated proppants.

2. Description of the Prior Art

In the completion and operation of oil, gas and water wells and similar boreholes, it frequently is desirable to alter the producing characteristics of the formation by utilizing various treating fluids. Many such treating fluids contain gelled or viscosified fluids and or solid particles, commonly referred to as "proppants." These gelled fluids further include linear gels and crosslinked gels.

Examples of subterranean treatments employing gelled fluids in combination with proppants include hydraulic fracturing and sand control treatments. In the case of hydraulic fracturing, proppants, suspended in the gelled fluid, are pumped downhole under pressure sufficient to fracture the target formation. The proppants, carried by the fluid, are positioned between the parted faces of the formation. In this way, when the pressure against the formation is relaxed, the proppants maintain the fracture in an open or propped condition.

In the case of sand control, particulate materials may be placed in the well to prevent the influx or incursion of formation sand or fine particles. In other instances, the gelled fluid, without particulate, may be used for example as a "pad" or other precursor treatment to contacting the formation with the gel/proppant system.

Upon completion of the treatment, it is generally desirable to remove the gelled treating fluid from the formation of the well. To effectively remove the fluid, the viscosity of the fluid is reduced. The reduction of the gelled-fluid viscosity is referred to as "breaking" the gel. The agent responsible for breaking the gel is referred to as a "breaker" or "gel breaker."

Polysaccharide polymers are well known gelling or viscosifying agents useful in treating subterranean formations. Suitable polysaccharide polymers include cellulose derivatives and glactomannan gums. Crosslinking agents, such as for example boron, titanium zirconium, and aluminum, when added to a quantity of hydrated polysaccharide polymer generally increase the viscosity thereof.

Particulate materials suitable for use in gelled fluids may be selected from both organic and inorganic materials. Common organic materials include for example, wood chips, nut shells, crushed coke, and coal. Inorganic materials include for example crushed rock, sand, spherical pellets of glass, sintered bauxite and various synthetic ceramics.

In some instances, the particulate material may be coated with natural or synthetic film-forming materials. The coating on the surface of the particulate assists in controlling fragmentation and dispersion of particulate fragments. Particulate fragmentation can result from closure pressures exerted by the formation on the particulate. Controlling the migration of these fragments enhances formation conductivity by preventing free fragments from plugging formation flow passages.

In addition to the above mentioned improvements achieved by coated particulates, coating with a curable material also reduces particulate flow-back and improves overall bed strength. The uncured resin coated particulate, upon exposure to curing conditions, such as a curing agent or elevated temperatures, forms a cured consolidated matrix.

Traditional gel breakers include enzymes and oxidizing breakers. Examples of such oxidizing breakers include ammonium, sodium or potassium persulfate; sodium peroxide; sodium chlorite; sodium lithium or calcium hypochlorite; chlorinated lime; potassium perphosphate; sodium perborate; magnesium monoperoxyphthalate hexahydrate; and several organic chlorine derivatives and/or salts thereof.

At formation temperatures of between about 75° F. to about 120° F. and pH range of generally between about 4 to 9, enzyme breakers are suitable. At formation temperatures above about 140° F. enzyme breakers are inadequate and oxidizing breakers are required. Generally, depending upon the temperature of the gelled carrier fluid, between about 0.5 and 5.0 pounds of oxidizing breaker, such as a persulfate breaker, per 1000 gallon of aqueous gel is sufficient to break the carrier fluid in a non-resin coated proppant/aqueous gelled carrier fluid system.

Curable adhesive proppant coatings, such as phenolic and furan resins, in an uncured state, exhibit some compatibility with aqueous gel carrier fluids and enzyme gel breakers. However, when the pH and temperature of the gelled carrier fluid preclude the use of enzyme breakers, it is not uncommon to employ exceedingly high concentrations of oxidizing breakers to reduce the viscosity of these carrier fluids when such carrier fluids are in contact with uncured resins. Generally, the concentration of oxidizing breaker required in an uncured resin/aqueous gel system can be as high as 4 to 40 times the amount required for non-resin or cured resin/aqueous gel systems.

Solutions to the oxidizing breaker problem presented by the uncured resin-aqueous gel system have been as straight forward as adding increased amounts of oxidizing breaker to as complex as encapsulating the oxidizing breaker. The first alternative can result in uncontrolled breaks or limited breaking. Uncontrolled breaking can result in a "sand out" of the proppant prior to optimal placement in the target formation. Limited gelled fluid breaking can reduce formation conductivity by leaving unbroken gel in the formation and the proppant bed.

Breaker encapsulation, while somewhat more successful than the former method, in many instances also requires the addition of excessive quantities of oxidizing breaker. In addition, the process of encapsulation increase the cost of the breaker and may result in uneven distribution of the breaker in the curing proppant matrix or proppant pack. Thus there exist the need for improved gel breaker systems, and particularly gel breakers systems capable of predictably reducing the viscosity of the gelled fluid when such gelled fluid is admixed with an uncured or curing resin.

SUMMARY OF TEE INVENTION

In accordance with the present invention, compositions and methods have been discovered which provide improved degradation of crosslinked polymer treating fluids and particularly the degradation of boron crosslinked polymer treating fluids in the presence of uncured resin-coated proppants. Generally, breaker systems of the present invention are compositions containing an oxidizing breaker and a sequestering agent comprising a copolymer of vinyl pyrrolidone and acrylic acid.

It is therefore an object of the present invention to provide improved degradation of crosslinked polymer treating fluids and particularly improved degradation of boron crosslinked polymer treating fluids.

It is another object of the present invention to provide improved degradation of crosslinked polymer treating fluids in the presence of an uncured resin composition and particularly improved degradation of boron crosslinked polymer treating fluids in the presence of uncured phenolic or furan resin.

DESCRIPTION OF THE PREFERRED EMBODIMENT

In accordance with the compositions and methods of the present invention, a crosslinked-gel system and methods for employing the same are provided. The preferred system includes a hydratable gelling agent, a crosslinking agent, an aqueous liquid, an aqueous crosslinked-gelled breaker, a sequestering agent and a curable resin.

The gelling agent includes hydratable polymers which contain, in sufficient concentration and reactive position, one or more of the functional groups such as, hydroxyl, cishydroxyl, carboxyl, sulfate, sulfonate, amino or amide. Particularly suitable polymers are polysaccharide and derivatives thereof which contain one or more of the following monosaccharide units: galactose, mannose, glucoside, glucose, xylose, arabinose, fructose, glucuronic acid or pyranosyl sulfate. Natural hydratable polymers containing the foregoing functional groups and units include guar gum and derivatives thereof, locust bean gum, tara, konjak, tamarind, starch, cellulose and derivatives thereof, karaya, xanthan, tragacanth and carrageenan.

Hydratable synthetic polymers and copolymers which contain the above-mentioned functional groups and which can be utilized in accordance with the present invention include, but are not limited to, polyacrylate, polymethacrylate, polyacrylamide, maleic anhydride methylvinyl ether copolymers, polyvinyl alcohol and polyvinylpyrrolidone.

The preferred hydratable polymers of the present invention have molecular weights in the range of from about 100,000 to 4,000,000. The most preferred hydratable polymers have molecular weights from about 600,000 to about 2,400,000, and are preferably guar or cellulose derivatives.

The aqueous liquid may include water, a sodium chloride brine solution, a potassium chloride brine solution, water-alcohol mixtures and the like. The hydratable polymer and aqueous liquid are preferable prepared by combining the polymer with the aqueous liquid in an amount in the range of from about 20 to about 120 pounds of polymer per 1,000 gallon of aqueous liquid.

Preferably, after combining the aqueous liquid with the gelling agent, the gelling agent is crosslinked by the addition of sufficient quantities of a crosslinking agent. Typical crosslinking agents include, for example, boron, titanium, antimony, zirconium and aluminum. The amount of crosslinking agent added to the hydrated gelling agent may depend upon several factors, such as for example, the type and quantity of polymer present in the aqueous liquid, such surface conditions to be encountered by the crosslinked gel system, and the purpose for which the crosslinked gel system is to be used, i.e., gel pad, fracturing, graveling packing, etc. These and other factors are appreciated and well known by those skilled in the art of preparing crosslinked gel systems, and therefore sufficient quantities of crosslinking agent are readily determinable.

Proppants or particulate material, for use in the present invention, may be selected from both organic and inorganic materials. Common organic materials include for example, wood chips, nut shells, crushed coke and coal. Inorganic materials include for example crushed rock, sand spherical pellets of glass and synthetic ceramics.

The breaker can comprise substantially any of the well known oxidizing breakers. Examples of breakers include ammonium persulfate, sodium persulfate, potassium persulfate, sodium peroxide, sodium chlorite, sodium, lithium or calcium hypochlorite, potassium perphosphate, sodium perborate and the like. The breaker generally will be admixed with the gelled aqueous liquid in an amount of from about 0.1 to about 10 pounds per 1000 gallon of aqueous gel and preferably, from about 0.5 to about 5 pounds per 1000 gallon of aqueous gel.

The sequestering agent comprises a copolymer of vinyl pyrrolidone and acrylic acid. The vinyl pyrrolidone is present in an amount of from about 5 to about 75 percent by weight. Preferably, the vinyl pyrrolidone is present in an amount of from about 10 to about 30 percent by weight of the copolymer.

The preferred curable adhesive employed in the present invention are phenolic or furan resins. Furan resins are typically known as two-step resin systems. Two step systems generally require the addition of an accelerator or hardening agent to the resin to initiate resin polymerization or curing.

Typically, phenolic resins are one-step resins. In other words, one-step phenolic resins self-polymerize with increasing temperature and do not require the addition of an accelerator or hardening agent. Liquid phenolic resins, such as resole resin, generally polymerize slowly under unrefrigerated conditions. Solid resoles may generally be kept indefinitely. When utilizing a solid phenolic resin, dissolution in a suitable solvent and formulation with the breaker before combining with the crosslinked gel/aqueous liquid admixture or proppant are preferred.

As mentioned previously, any of the preferred curable adhesives may be combined with the proppant by either precoating, batch mixing or on-the-fly mixing.

Proppant is generally present in the crosslinked gel in an amount in the range of from about 2 to about 30 pounds of proppant per gallon of gelled aqueous carrier liquid. Most preferably, the proppant is present in the mixture in an amount in the range of from about 2 to about 20 pounds per gallon of aqueous carrier liquid. Whether precoated, batch mix coating or coating on-the-fly, the preferable ratio of curable adhesive to proppant is about 1 to about 20 pounds of curable adhesive per each 100 pounds of proppant and most preferably from about 2 to about 5 pounds per 100 pounds of proppant.

When admixing particulate materials with a mixture of the above curable adhesives and crosslinked gel/aqueous liquids, surface active agents or coupling agents can be utilized to promote the coating of the adhesive to the particulate material. Several surface active agents, which are well known to one with ordinary skill in the relevant art, are disclosed in U.S. Pat. No. 4,829,100, the entire disclosure. The surface active agents disclosed in U.S. Pat. No. 4,829,100 are suitable for use with phenolic and furan resins.

As previously discussed, the coupling agent promotes bonding of the curable adhesive to the proppant. Suitable coupling agents include functional silane such as N-beta-(aminoethyl)-gamma-aminopropyltrimethozysilane. A commercially available coupling agent is Silane A-1120, a product of Union Carbide, Danbury, Conn.

When employing the coated proppant/aqueous gel carrier fluid system of the present in fracturing operations, a fracture is first generated in the formation. The coated proppant/aqueous gel carrier fluid system is then pumped into the fracture. The carrier fluid bleeds off into the formation and deposits the coated proppant in the fracture. After placement of the coated proppant, the well is closed in with the injection pressure being maintained on the formation. As the injection pressure bleeds off, the fracture walls close on the coated proppant. The proppant matrix fuses with the passage of time forming a permeable proppant bed. When a one-step curable adhesive is applied to the proppant, ambient formation temperature heats the adhesive and initiates the curing thereof. Polymerization reaction proceeds until the resin is cured to an insoluble, infusible, crosslinked state forming a permeably proppant bed.

In gravel pack applications, the coated particles are suspended in the aqueous gelled carrier fluid and the admixture is pumped through tubing and through a crossover tool in the tubing and around the outside of a liner. The aqueous gelled carrier fluid enters the liner and returns to the surface via the crossover tool and the casing-tubing annulus. The coated particles screen out on the liner forming a filter bed in the borehole and in surrounding relation to the liner. After placement of sufficient quantities of coated particles the tubing and crossover tool may be retrieved. The coating materials cure and fuse as previously described.

To further illustrate the methods and compositions of the present invention and facilitate a clear understanding thereof, the following examples are given.

EXAMPLE

Borate crosslinkable gel fluid samples were prepared by admixing 40 pounds guar gum, 0.2 gallon ammonium acetate, 1.5 gallon 25% NaOH and 2 pounds KCl per 1000 gallons of aqueous fluid. A quantity of resin coated proppant comprising either AcFrac CR or AcFrac SB from Acme Resin Corporation, Westchester, Ill., in an amount of 10 pounds/gallon of fluid was admixed with each sample. A breaker comprising sodium persulfate was admixed with each sample in the amount set forth in the table below. A quantity of Polybor, a borate crosslinking agent manufactured by U.S. Borax, Valencia, Calif., was admixed with each sample in an amount of 2 pounds/1000 gallon of aqueous fluid. The aqueous fluid comprised Duncan, Oklahoma tap water. The sequestering agent comprised the compounds indicated in the table present in the amounts indicated. The individual test samples were placed in 32 oz. glass jars after admixing all the constituents. The samples then were placed in a 125° F. water bath at about 140° F. which was heated over about 15 minutes to 175° F. Thereafter, viscosity measurements were made with a Model 35 Fann viscometer using a No. 1 spring and standard bob. If a fluid was too viscous to be measured, the fluid was visually judged to be either crosslinked (c) or weakly crosslinked (WC). Viscosity measurements were made at 300 rpm which corresponds to 511 sec $^{-1}$. After 24 hours, the fluids were cooled to room temperature and fluid viscosity measurements were repeated. The results of the tests are set forth in the Table, below.

TABLE

| Test No. | Sequestering Agent (quantity lb/1000 gal. fluid) | | Resin Coated Proppant | Breaker, lb/1000 gal. fluid | Apparent Viscosity, cp at 511 sec$^{-1}$ 175° F., at time, hrs | | | | | | |
|---|---|---|---|---|---|---|---|---|---|---|---|
| | | | | | 1 | 2 | 3 | 4 | 6 | 24 | 24[1.] |
| 1 | None | | AcFrac CR | 4 | C | WC | 55 | 45 | 29 | 25 | C |
| 2 | N-(N,N-dimethyl(amino)-propyl-2-pyrrolidone | (1) | AcFrac CR | 4 | C | WC | 55 | 45 | 37 | 20 | C |
| 3 | N-(N,N-dimethyl(amino)-propyl-2-pyrrolidone | (10) | AcFrac CR | 4 | C | C | C | C | C | C | |
| 4 | VPAA[2] 75:25 | (1) | AcFrac SB | 3 | C | C | C | C | C | 25 | C |
| 5 | VPAA[2] 75:25 | (10) | AcFrac SB | 3 | C | C | C | C | 20 | 13 | C |
| 6 | VPAA[3] 50:50 | (1) | AcFrac SB | 3 | C | C | C | C | C | 50 | C |
| 7 | VPAA[3] 50:50 | (10) | AcFrac SB | 3 | 13 | 9 | — | — | — | 8 | C |
| 8 | VPAA[4] 25:75 | (1) | AcFrac SB | 3 | C | C | C | C | C | C | C |
| 9 | VPAA[4] 25:75 | (10) | AcFrac SB | 3 | 9 | 7 | — | — | — | 4 | C |
| 10 | VPAA[5] 75:25 | (1) | AcFrac SB | 3 | C | C | C | C | WC | 20 | C |
| 11 | VPAA[5] 75:25 | (10) | AcFrac SB | 3 | C | 20 | 15 | 10 | 8 | 7 | C |
| 12 | VPAA[6] 50:50 | (1) | AcFrac SB | 3 | C | C | WC | 50 | 13 | 10 | C |
| 13 | VPAA[6] 50:50 | (10) | AcFrac SB | 3 | 9 | 5 | — | — | — | 5 | C |
| 14 | VPAA[7] 25:75 | (1) | AcFrac SB | 3 | C | 17 | 11 | 9 | 7 | 5 | C |
| 15 | VPAA[7] 25:75 | (10) | AcFrac SB | 3 | 9 | 8 | — | — | — | 6 | C |
| 16 | N-Octylpyrrolidone | (1) | AcFrac SB | 3 | C | C | C | C | C | C | C |
| 17 | N-Octylpyrrolidone | (10) | AcFrac SB | 3 | C | C | C | C | C | C | C |
| 18 | N-Dodecylpyrrolidone | (1) | AcFrac SB | 3 | C | C | C | C | C | C | C |
| 19 | N-Dodecylpyrrolidone | (10) | AcFrac SB | 3 | C | C | C | — | C | 13 | C |
| 20 | Polyvinylpyrrolidone PVP K-15[8.] | (1) | AcFrac SB | 3 | C | C | C | C | C | C | C |
| 21 | Polyvinylpyrrolidone PVP K-30[9.] | (1) | AcFrac SB | 3 | C | C | C | C | C | C | C |
| 22 | Polyvinylpyrrolidone PVP K-90[10.] | (1) | AcFrac SB | 3 | C | C | C | C | C | 30 | C |
| 23 | Polyvinylpyrrolidone PVP K-120[11.] | (1) | AcFrac SB | 3 | C | C | C | C | C | 20 | C |

TABLE-continued

| Test No. | Sequestering Agent (quantity lb/1000 gal. fluid) | Resin Coated Proppant | Breaker, lb/1000 gal. fluid | Apparent Viscosity, cp at 511 sec$^{-1}$ 175° F., at time, hrs | | | | | | |
|---|---|---|---|---|---|---|---|---|---|---|
| | | | | 1 | 2 | 3 | 4 | 6 | 24 | 24[1] |
| 24 | Polyvinylpyrrolidone PVP K-120 (10) | AcFrac SB | 3 | C | C | C | — | 45 | 9 | C |

[1] viscosity measured after cooling to 75° F.
[2] weighted average molecular weight 250 obtained from ISP Technologies, Inc.
[3] weighted average molecular weight 250 obtained from ISP Technologies, Inc.
[4] weighted average molecular weight 250 obtained from ISP Technologies, Inc.
[5] weighted average molecular weight 80 obtained from ISP Technologies, Inc.
[6] weighted average molecular weight 80 obtained from ISP Technologies, Inc.
[7] weighted average molecular weight 80 obtained from ISP Technologies, Inc.
[8] weighted average molecular weight 12,000 obtained from ISP Technologies, Inc.
[9] weighted average molecular weight 55,000 obtained from ISP Technologies, Inc.
[10] weighted average molecular weight 1,200,000 obtained from ISP Technologies, Inc.
[11] weighted average molecular weight 2,800,000 obtained from ISP Technoloiges, Inc.

The foregoing test data clearly illustrates the benefits of break enhancement obtained through use of the sequestering agent of the present invention. The presence of slight amounts of copper ion, when added to the test sample, has been found to further enhance the rate of breaking when resin coated proppants are present in the gelled liquid.

While preferred embodiments of the invention have been described herein, it is to be understood that changes or modifications can be made in the methods or compositions by an individual skilled in the art without departing from the spirit or scope of the invention as set forth in the appended claims.

What is claimed is:

1. A composition comprising:
 a crosslinked gel comprising an aqueous fluid hydrated polymer and a crosslinking agent;
 a curable resin coated upon a particulate comprising an at least partially uncured phenolic resin or uncured furan resin;
 a crosslinked gel breaker comprising an oxidizing agent; and
 a sequestering agent comprising a copolymer of vinylpyrrolidone and acrylic acid.

2. The composition of claim 1 wherein said hydratable polymer comprises a polysaccharide having a molecular weight in the range of from about 100,000 to about 4,000,000.

3. The composition of claim 1 wherein said crosslinking agent comprises at least one member selected from the group of boron, titanium, zirconium, antimony or aluminum ions.

4. The composition of claim 1 wherein the ratio of vinylpyrrolidone to acrylic acid in said sequestering agent is in the range of from about 5:95 to about 75:25.

5. The composition of claim 1 wherein the ratio of vinylpyrrolidone to acrylic acid in said sequestering agent is in the range of from about 10:90 to about 50:50.

6. The composition of claim 1 wherein said crosslinked gel is a borate crosslinked polysaccharide.

7. A method of reducing the viscosity of a hydrated polymer gel containing a particulate comprising:
 providing a hydrated polymer gel containing a particulate having an at least partially uncured coating of a phenolic or furan resin thereon;
 admixing an oxidizing breaker with said gel; and
 admixing a sequestering agent with said gel comprising a copolymer of vinylpyrrolidone and acrylic acid to sequester at least a portion of any phenolic extracts in said gel from said particulate coating.

8. The method of claim 7 wherein said copolymer comprises vinylpyrrolidone to acrylic acid in the ratio of from about 5:95 to about 75:25.

9. The method of claim 7 wherein said copolymer comprises vinylpyrrolidone to acrylic acid in the ratio of from about 10:90 to about 50:50.

10. The method of claim 7 wherein said oxidizing breaker is a persulfate.

11. The method of claim 7 wherein said hydrated polymer gel is a hydrated polysaccharide.

12. The method of claim 11 wherein said polysaccharide is crosslinked with at least one crosslinking agent selected from the group of titanium, a boron source, antimony, aluminum and zirconium.

* * * * *